Feb. 21, 1950

W. FAULKNER 2,498,333

PHONOGRAPH RECORD HOLDING SPINDLE

Filed July 2, 1943

INVENTOR.
WILLARD FAULKNER
BY Richey & Watts
ATTORNEYS

Patented Feb. 21, 1950

2,498,333

UNITED STATES PATENT OFFICE 2,498,333

PHONOGRAPH RECORD HOLDING SPINDLE

Willard Faulkner, Chicago, Ill., assignor, by mesne assignments, to Admiral Corporation, Chicago, Ill., a corporation of Delaware Application July 2, 1943, Serial No. 493,242

8 Claims. (Cl. 274—10)

This invention relates to record players and more particularly to an improved record holding spindle for an automatic player where the records are placed consecutively on the turntable and played and method of making the same.

Automatic record players, sometimes called automatic record changers wherein the records are supported in stacked relation above the turntable and dropped one at a time onto the turntable, have been well known and have obtained a considerable degree of popularity. These players are mostly of two types; one where the records are supported adjacent the outer edges by means on each side of the turntable which operates to drop the records singly onto the turntable and each other and the other where they are supported by a single support at the side of the turntable and a spindle which engages the stack of records at the center. This invention has to do particularly with the latter type, one such changer being more fully disclosed in my copending application, Serial No. 393,984, filed May 17, 1941, now Patent No. 2,331,383, granted October 12, 1943.

In these changers of the last type discussed the records are stacked on the spindle and side support and the individual records are automatically released from the spindle and dropped one at a time, on top of each other on the turntable. Some of these release the records by the action of support on the side which pushes the record off of a step on the spindle, others release the record through the action of a mechanism which operates through the spindle. In the present invention the record is released by pushing it from the side off of the shoulder on the spindle on which it rests after which it drops onto the turntable. In order to prevent all the records from dropping at once means is provided to engage all the records, but the bottommost record, and prevent them from being lowered.

After the records have been played it is necessary to remove them from the turntable and spindle and place another stack of records on the spindle. In some instances the records are removed by taking out the spindle which is supported stationary relative to the turntable as is described in my copending application. This has a disadvantage in that it is necessary to remove the spindle. The spindle being removable often became mislaid. Furthermore, it is sometimes difficult for the user to replace the spindle properly.

The present invention contemplates an improved spindle which is permanently secured in the mechanism and does not need to be removed in order for the records to be taken off of the turntable and spindle.

It is therefore an object of my invention to provide an improved record holding spindle.

Another object of my invention is to provide a record holding spindle from which the records may be readily removed.

Another object of my invention is to provide a spindle for holding a stack of records which does not need to be removed from the turntable to remove the records.

Another object of my invention is to provide a spindle for holding a stack of records above a turntable which will not damage the records when they are removed.

Still other objects of the invention and the invention itself will become apparent from the following description of an embodiment thereof which description is illustrated by the accompanying drawings and which forms a part of this specification.

Figure 4:
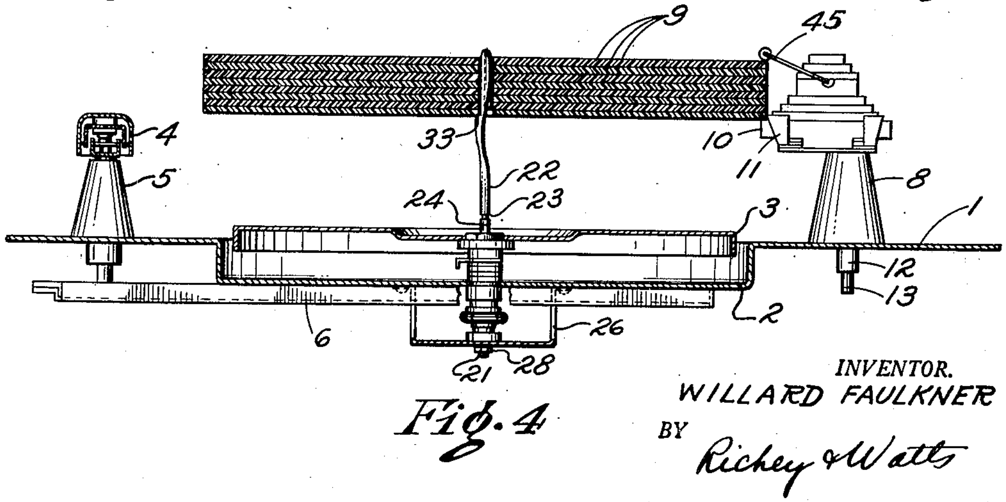
Fig. 4 is a vertical section of a record playing mechanism showing the spindle in position and a stack of records ready for playing.

Referring now to the drawings throughout which like parts have been designated by like reference characters and more particularly to Fig. 4 wherein there has been illustrated in cross section an automatic record player which incorporates the spindle of my invention, 1 represents the table or supporting plate for the record playing mechanism and is provided with a central well 2 in which the turntable 3 is disposed.

To the left of the figure is indicated the pickup arm and pedestal 4 and 5 and below the frame 2 is shown a portion of the pickup arm controlling mechanism 6. However, inasmuch as any suitable mechanism may be used for controlling the timed movements of the pickup arm and record ejector means, no particular mechanism is shown.

To the right of the turntable as viewed in Fig. 4 is disposed a pedestal 8 which carries a platform for supporting a stack of records 9 adjacent their edges, there being provided an ejector member 11 which is arranged to contact with the edge of the bottommost record of the stack 9 to slide it from under the stack. 12 and 13 are the ends of the sleeve and rod respectively which have a mechanism, not shown, for controlling the movements of the ejector mechanism.

Figure 1:
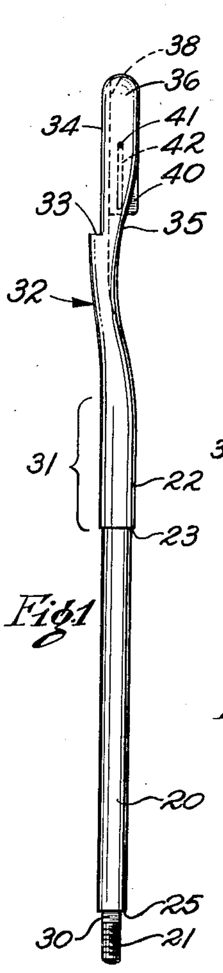
Fig. 1 is a side-elevation of the spindle of my invention removed from the turntable mechanism.

As best illustrated in Fig. 1 the improved record holding spindle of my invention comprises a shank 20, the lower end of which terminates in a threaded portion 21 of reduced diameter. Above the shank is a body 22 of larger diameter, the junction of the two portions forming a shoulder 23. The shank 20 is adapted to extend down through the turntable spindle 24. The shoulder 25 at the junction of the threaded end 21 and the shank 20 is adapted to be seated on a bracket 26 suspended from the frame 1 below the turntable, and is held in position by a nut 28 threaded on the end 21. This enables the spindle to be secured in the frame and to prevent accidental removal thereof. The lower end may be provided with a square portion 30 on the lower end of the spindle below the shoulder 25 which fits in a square hole in the bracket 26 and thus enables the spindle to be held in its proper relative position.

Referring again to Fig. 1 it will be noted that the body 22 extends straight upward from the shoulder 23 for a distance indicated by the bracket 31 equal to the thickness of the stack of records to be played. This straight zone insures the proper alignment of the records in playing position on top of the turntable and each other.

Immediately above the zone 31 the body becomes of slightly reduced thickness, as viewed in Fig. 1, reaching its minimum thickness at 32. At the same time it is offset to the left and toward a shoulder 33, the shoulder 33 being adapted to support the stack of records by engaging the lowermost record at the portion adjacent the center hole.

Extending upward from the shoulder 33 is the stack holding portion of the spindle. It starts with a portion 35 of reduced diameter as viewed in Fig. 1 and curves outward away from the shoulder 33 gradually merging with the cylindrical end 36 which is of substantially the same diameter and concentric with the zone 31. The part 36 and the zone 31 are but slightly smaller than the center holes of the records, so as to provide a close sliding fit therewith.

Figure 2:
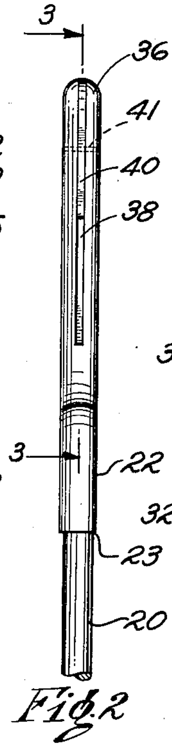
Fig. 2 is a similar view taken at 90° from the first view.

As best shown in Fig. 2 the various portions of the spindle from the shoulder 23 are of substantially equal diameter, the variations in thickness being from the sides as viewed in Fig. 1. This causes the record holes to remain aligned in one direction but allows them to move laterally in the other direction 90° removed therefrom.

Figure 3:
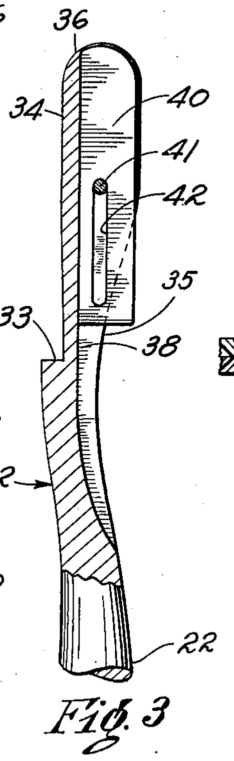
Fig. 3 is an enlarged section taken on the lines 3—3 of Fig. 2.

The upper end of the spindle is provided with a kerf 38 which extends straight down through the top of the spindle through the parts 36, 35 into the zone 32. In this kerf is disposed a slide member 40 which may slide in the kerf and is retained in the kerf by a pin 41 which extends through the spindle and through a slot 42 in the slide. The slide fits sufficiently loose in the kerf and about the pin 41 that it is normally held by gravity in a lowered position as shown in Figs. 1 to 3, inclusive. In this position the top of the slide is flush with the top of the spindle but the lowermost part extends downwardly parallel to and in prolongation with the part 36. When in the lower position the bottom part extends out of the kerf as best shown in Figs. 1 and 3.

Referring again to Fig. 4 where a stack of records are shown supported on the shoulder 33 of the spindle, adjacent their center holes and the edge of the records being engaged on the platform 10. It will be seen that the lowermost record engages the shoulder 33 and the platform 10 and that the other records rest on top of the lower record, being held in alignment by the slide 40 and the cylindrical part 34. Since the sides of the spindle are substantially parallel, as viewed in Fig. 2, it will be seen that the stack of records are held in alignment.

It should be noted that the slide 40 terminates a distance above the shoulder 33 equal to or slightly greater than the thickest record to be played, and that therefore, as viewed in Fig. 4, the bottommost record is free to be pushed off of the shoulder 33 by the ejecting mechanism on the side. A spring pressed arm 45 engages with the top of the top record and holds the stack on the edge of the platform.

As described in my copending application, the tone arm is swung away from the turntable and a record is ejected from the bottom of the stack by the ejector 11 which engages the bottommost records and slides it off of the platform 10 and shoulder 33 into alignment with the part 32, whereupon the record drops down onto the turntable, being guided in its fall by the parts 32 and 31. The tone arm is then moved over onto the record, the record played and after being played the cycle is repeated. While a record is being ejected the remaining records are held in alignment by the cooperating efforts of the slide 40 and the part 34.

This cyclic operation continues until all of the records are played. When the last record is played all the records of the stack are on the turntable being held in properly centered relation for playing by the rotatable spindle 24 and zone 31 on the stationary record holding spindle.

Figure 5:
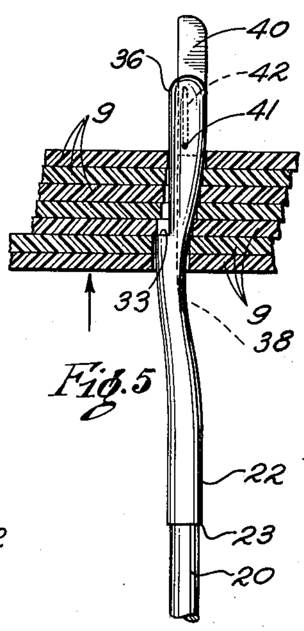
Fig. 5 is a side view, showing in fragmentary section the center portions of a stack of records as they are being removed from the turntable.

Previously when it was desired to remove the records it was common practice to pull out the spindle. With the present invention, however, the spindle need not be removed. The records are merely lifted upward. The topmost record engages the bottom of the slide 40 and slides it upward in the kerf to the position shown in Fig. 5. At this time the part that formerly projected from the kerf is below the edge thereof and the records are free to slide on the surface of the spindle and be lifted off of the spindle.

After the records are removed from the spindle the slide falls back to the position shown in Figs. 1 to 3, inclusive, and the device is ready for another stack of records to be placed thereon.

It will thus be seen that I have provided an improved record holding spindle which holds the records in proper alignment for the automatic record playing function and wherein the records can be quickly and easily removed without damage and without removing the spindle after the records are played.

In constructing the device I have found it expedient to form the spindle by taking a piece of straight rod of the desired diameter and curving the rod by bending it to provide an outwardly bowed portion at 32 and 35, and then chucking the rod at 22 and turning the end from the cylindrical part 36 to provide the shoulder 33. Finally the part 32 can be ground slightly to reduce the thickness at this point as viewed in Fig. 1. Thus only the bent part is removed above the shoulder 35, and the sides as viewed in Fig. 2 remain parallel. Finally the kerf 38 is milled to the formation as best illustrated in Fig. 3, the slide 40 inserted, pinned in place and the ends of the pin ground off flush with the surface.

Figure 6:
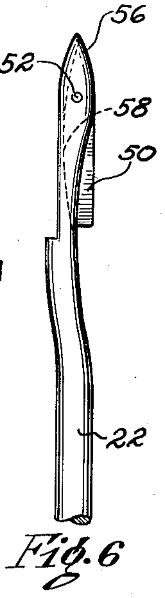
Fig. 6 is a side elevational view of the upper end of a spindle showing a modified form of the invention.
Figure 7:
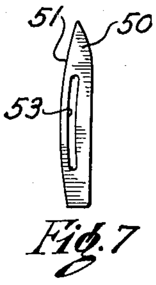
Fig. 7 is an elevational view of the slide used in Fig. 6 removed from the spindle.

In Figs. 6 and 7 I have illustrated another embodiment of my invention, which is distinguished mainly from the other device in that the end 56 tapers to a point. In this case the kerf 58 also extends vertically in the spindle but has a curved bottom or is of varying depth. The slide 50, best shown in Fig. 7, is provided with a curved surface 51 which is complementary to that of the kerf bottom, and the slide is held in the kerf by a pin 52 which extends through the slot 53 that is also curved.

It should be noted that the bottom of the kerf, the curved edge of the slide and the curved slot 53 are all generated from radii having the same center, thus enabling the slide to follow a curved path when raised in the kerf. This device has another advantage over the other modification in that the pointed end allows for easier placement of the records thereon and that the device has a more symmetrical or streamlined appearance.

The operation is fundamentally the same as the other embodiment, the only difference being that the slide when moved upwardly follows a curved path rather than traveling straight and vertical.

Having thus described my invention I am aware that numerous and extensive departures may be made therefrom without departing from the spirit or scope of the invention.

I claim:

1. A device of the class described including an upstanding member having a shoulder for supporting a stack of records, means for guiding the records onto said shoulder including a pilot formed with a kerf, a slide member movably disposed and movable in the kerf in a vertical direction to a point spaced from the shoulder, said slide adapted to extend beyond the confines of the kerf out of the kerf at a point below the pilot and adapted to engage the inside of the hole of the record on one side to maintain the records against lateral shifting.

2. A record holding spindle comprising a shank for support in a record playing mechanism, a record guiding body extending from said shank and formed to provide a shoulder spaced from the end of the spindle adapted to support a record adjacent its center hole, a record engaging head extending from said shoulder and offset therefrom, said head at the point of engagement with the shoulder being reduced in thickness and together with the shoulder being of a diameter slightly smaller than the hole in a record to permit the record to be moved off of the shoulder and drop around the shank onto a turntable, said head increasing in diameter from the shoulder toward the end and being of a diameter in a zone at and near the end to substantially fill the hole of the record and being formed with a vertically extending kerf, a slidable member slidably disposed in the kerf and means for holding said member in the kerf.

3. A record holding spindle for automatic record players including a portion for supporting records to be played above the turntable and having a shoulder for supporting the lowermost record and a shank for holding the other records in a position to guide them onto the shoulder, said shank being tapered toward said shoulder and at the shoulder being of a diameter together with the shoulder to allow the record to be moved off the shoulder, means to hold the records in alignment for engagement with the shoulder comprising a slide member, said shank being formed with a kerf for receiving the slide member, said slide member being vertically slidable in said kerf and in its lower position together with the shank filling the record hole to hold the records in alignment and being movable upward by the records when the records are removed to permit free removal of the records from the spindle.

4. A record holding spindle for automatic record players including a body portion for maintaining alignment of the records on the turntable, an intermediate portion for guiding records down to said body, a shoulder for engagement with the lowermost record of a stack, a stack holding portion above said shoulder for holding records and comprising a top portion offset relative to the shoulder, said portion being of reduced diameter on the side opposite the shoulder, means in said portion to hold the records in alignment comprising a slide, a vertically extending kerf formed in the said upper portion for receiving the slide, means for holding said slide in said kerf and said slide extending beyond the confines of the kerf spaced above the shoulder adapted for engagement with the inside of the record hole to hold said records in engagement with said cylindrical portion, and said slide being slidable in said kerf and arranged to be moved upwardly into the top portion to allow free removal of the records from the spindle.

5. A record holding spindle for automatic record players comprising a body portion for guiding records to the turntable, a curved portion of reduced diameter extending to the body portion and provided with a shoulder on its upper end offset relative to the body portion for supporting a record adjacent its center hole, a stack holding portion at the end of said spindle extending upward from one side of said shoulder and in alignment with said body portion, said stack holding portion adjacent the shoulder being of reduced diameter and together with the shoulder ebing of a total diameter less than the diameter of a record center hole, means for guiding the records downward onto said shoulder comprising a slide, said stack holding portion formed with a vertical kerf for slidably receiving said slide, said slide being formed with a longitudinal slot and a pin extending through said stack holding portion of the spindle and said slot to slidably hold the slide in said kerf and limit the movement of the slide in the kerf, said slide extending beyond the confines of the kerf to a point spaced from the shoulder a distance equal to the thickness of a record and the end of said slide adapted to be engaged by records being removed from the kerf and slid upward therein to a point where it permits free removal of the records from the spindle.

6. A device of the class described for supporting a stack of records above a phonograph turntable including an upwardly extending member having a shoulder for engagement with a record adjacent its center hole, means for guiding records onto said shoulder comprising a pilot extending upwardly from the shoulder and offset therefrom and being of reduced diameter adjacent the shoulder to allow records to be slid off of the shoulder and means to direct the records straight down and cause positive alignment with the shoulder comprising a slide, a kerf formed in the pilot and having a curved bottom, said slide having a curved surface adapted to be slid in said curved bottom and means for retaining the slide in the kerf.

7. A record holding spindle comprising an upper stack holding and guiding portion at one end and a lower record guiding portion for guiding records onto a turntable at the other end, said portions being in alignment with each other, an offset portion intermediate said upper and lower portions and being formed to provide an outwardly extending horizontal shoulder offset relative to said upper and lower portions, said upper portion being of gradually reduced thickness toward said shoulder and of minimum thickness at the shoulder and being formed with a kerf in one side extending vertically and having a curved bottom, a slidable member disposed in said kerf and having a curved surface, a curved slot in said slide, and pin means bridging the sides of the kerf and extending through said slot to retain the slide in the kerf, said slide extending beyond the confines of the kerf in said portion of reduced thickness with the outer edge thereof disposed in a plane parallel to the two upper and lower portions for preventing lateral shifting of records on said upper portion, and being slidable upwardly to facilitate free removal of records from the spindle.

8. A turntable spindle for automatic phonographs which comprises a shank portion adapted to be mounted in concentric relation with the turntable, said shank portion having a record supporting shoulder thereon, a head portion beyond said shoulder for reception of a stack of unplayed records the lowermost one of which may rest on said shoulder, said head portion having a seat therein terminating in an opening at the side of said head opposite said shoulder, and a record detaining member slidably carried in said seat, said member normally extending through said opening to a point spaced from said shoulder a distance somewhat greater than the thickness of a record whereby said lowermost record may be moved laterally off of said shoulder while said detaining member prevents lateral movement of the remaining records of the stack.

WILLARD FAULKNER.

REFERENCES CITED

The following references are of record in the file of this patent:

UNITED STATES PATENTS

| Number | Name | Date |
|---|---|---|
| 847,710 | Vaughan | Mar. 19, 1907 |
| 1,999,077 | Bendette | Apr. 23, 1935 |
| 2,063,199 | Slater | Dec. 8, 1936 |
| 2,291,158 | Holstensson et al. | July 28, 1942 |
| 2,352,542 | Heins, Jr. | June 27, 1944 |
| 2,374,080 | Dale | Apr. 17, 1945 |

FOREIGN PATENTS

| Number | Country | Date |
|---|---|---|
| 822,026 | France | Sept. 6, 1937 |